(12) United States Patent
Terao

(10) Patent No.: US 8,913,271 B2
(45) Date of Patent: Dec. 16, 2014

(54) INFORMATION PROCESSING APPARATUS, DISPLAY CONTROL METHOD, AND STORAGE MEDIUM STORING PROGRAM

(71) Applicant: Canon Kabushiki Kaisha, Tokyo (JP)

(72) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/749,176

(22) Filed: Jan. 24, 2013

(65) Prior Publication Data

US 2013/0201514 A1   Aug. 8, 2013

(30) Foreign Application Priority Data

Feb. 8, 2012   (JP) ................. 2012-025532

(51) Int. Cl.
*G06F 15/00* (2006.01)
*H04N 1/00* (2006.01)
*H04N 1/44* (2006.01)

(52) U.S. Cl.
CPC .... *H04N 1/00514* (2013.01); *H04N 2201/0039* (2013.01); *H04N 1/4433* (2013.01); *H04N 2201/0094* (2013.01); *H04N 1/4426* (2013.01)
USPC ....................................... 358/1.14

(58) Field of Classification Search
USPC ....................................... 358/1.14
See application file for complete search history.

(56) References Cited

U.S. PATENT DOCUMENTS

2010/0306250 A1* 12/2010 Mizunashi .............. 707/769

FOREIGN PATENT DOCUMENTS

JP   2001-358864 A   12/2001
JP   2006-042264 A   2/2006

* cited by examiner

*Primary Examiner* — Saeid Ebrahimi Dehkordy
(74) *Attorney, Agent, or Firm* — Fitzpatrick, Cella, Harper & Scinto

(57) ABSTRACT

An information processing apparatus which stores a table in which a destination group and a user having a browsing right to browse the destination group are associated with each other refers to the table based on user information, and displays a list of destination groups for which the user has the browsing right. The apparatus accepts, from the user, selection of a destination group from the displayed list, and displays destinations included in the selected destination group.

6 Claims, 11 Drawing Sheets

FIG. 7A

| GROUP ADDRESS BOOK | GROUP ADDRESS BOOK ID | ACCESS ENABLE GROUP | ACCESS RIGHT |
|---|---|---|---|
| GROUP DESTINATION TABLE 1 | 1 | Group1/Group3 | REFERENCE |
| GROUP DESTINATION TABLE 2 | 2 | Group1 | REFERENCE/ REGISTRATION |
| GROUP DESTINATION TABLE 3 | 3 | Group5 | REFERENCE/ REGISTRATION |
| GROUP DESTINATION TABLE 4 | 4 | Group2 | REFERENCE/ REGISTRATION/EDIT |
| ⋮ | ⋮ | ⋮ | ⋮ |
| GROUP DESTINATION TABLE 9 | 9 | Group1/Group4 | REFERENCE/ REGISTRATION/EDIT/DELETE |
| GROUP DESTINATION TABLE 10 | 10 | Group4 | REFERENCE/ REGISTRATION |

| DESTINATION NAME | DESTINATION TABLE ID |
|---|---|
| DESTINATION TABLE 1 | 1 |
| DESTINATION TABLE 2 | 2 |
| DESTINATION TABLE 3 | 3 |
| DESTINATION TABLE 4 | 4 |
| ⋮ | ⋮ |
| DESTINATION TABLE 7 | 7 |
| DESTINATION TABLE 8 | 8 |

< DESTINATION REGISTRATION >

1001 — PERSONAL ▼

1002 — NAME : [        ]

1003 {
PROTOCOL : SMB ▼
HOST NAME : [        ]
FOLDER PATH : [        ]
USER NAME : [        ]
PASSWORD : [        ]
}

[ CANCEL ]    [ OK ]

FIG. 11A

1101 — DESTINATION : user1@test.com
      DESTINATION TABLE ID : 1
1102 — GROUP DESTINATION TABLE ID : 1

FIG. 11B

1101 — DESTINATION : user1@test.com
      DESTINATION TABLE ID : 1

INFORMATION PROCESSING APPARATUS, DISPLAY CONTROL METHOD, AND STORAGE MEDIUM STORING PROGRAM

BACKGROUND OF THE INVENTION

1. Field of the Invention

The present invention relates to an information processing apparatus for displaying a list of destinations, a display control method, and a storage medium storing a program.

2. Description of the Related Art

There are well known a function of converting a document scanned by a digital multifunctional peripheral or the like into electronic data, and transmitting it to an arbitrary transmission destination by e-mail, and a file transmission function using an SMB protocol or the like. In these functions, inputting transmission destination information (a server name, a user name, a password, and the like) for each transmission operation decreases the operability. It is, therefore, possible to improve the operability by registering, in advance, transmission destinations in an address book within an apparatus, and selecting a transmission destination from the address book in transmitting data.

In Japanese Patent Laid-Open No. 2006-042264, since a plurality of users share an image processing apparatus such as a digital multifunctional peripheral, the apparatus is configured to allow a user to register a personal address book, thereby improving the operability. Furthermore, Japanese Patent Laid-Open No. 2001-358864 describes a destination table list function of classifying respective transmission destinations and registering them in destination tables. Using the destination table list function enables to classify respective transmission destinations into sections to which they belong, and register them. In this case, even if a very large number of transmission destinations have been registered in the destination tables, it is possible to readily search for a desired destination.

Since, however, a destination table list which is not associated with a user himself/herself is also displayed in conventional systems, the operability in searching for a desired destination is not high. Furthermore, since access to the destination table list is not limited, it is possible to arbitrarily refer to/edit destinations within a destination table list created by another user, which lowers security.

SUMMARY OF THE INVENTION

An aspect of the present invention is to eliminate the above-mentioned problems with the conventional technology. The present invention provides an information processing apparatus, a display control method, and a storage medium storing a program, for maintaining security while improving the operability of a destination browsing operation.

The present invention in its first aspect provides an information processing apparatus for displaying a list of destination groups obtained by grouping destinations, comprising: an acquisition unit configured to acquire user information of a user; a storage unit configured to store a table in which each of the destination groups and a user having a browsing right to browse the destination group are associated with each other; a list display unit configured to refer to the table based on the user information acquired by the acquisition unit, and display a list of destination groups for which the user has the browsing right; an acceptance unit configured to accept, from the user, selection of a destination group from the list displayed by the list display unit; and a destination display unit configured to display destinations included in the selected destination group.

The present invention in its second aspect provides a display control method for an information processing apparatus which displays a list of destination groups obtained by grouping destinations, comprising: a storage step of storing a table in which each of the destination groups and a user having a browsing right to browse the destination group are associated with each other; a list display step of displaying a list of destination groups for which the user has the browsing right; an acceptance step of accepting, from the user, selection of a destination group from the list displayed in the list display step; and a destination display step of displaying destinations included in the selected destination group.

The present invention in its third aspect provides a computer-readable storage medium storing a program for causing a computer to execute a storage step of storing a table in which a destination group obtained by grouping destinations and a user having a browsing right to browse the destination group are associated with each other, a list display step of displaying a list of destination groups for which the user has the browsing right, an acceptance step of accepting, from the user, selection of a destination group from the list displayed in the list display step, and a destination display step of displaying destinations included in the selected destination group.

According to the present invention, it is possible to maintain security while improving the operability of a destination browsing operation.

Further features of the present invention will become apparent from the following description of exemplary embodiments with reference to the attached drawings.

BRIEF DESCRIPTION OF THE DRAWINGS

FIGS. 7A and 7B are tables each showing a data structure used in the group address book function;

FIG. 10 is a view showing a destination registration screen;

FIGS. 11A and 11B are views each showing the data structure of each destination;

DESCRIPTION OF THE EMBODIMENTS

Figure 1:
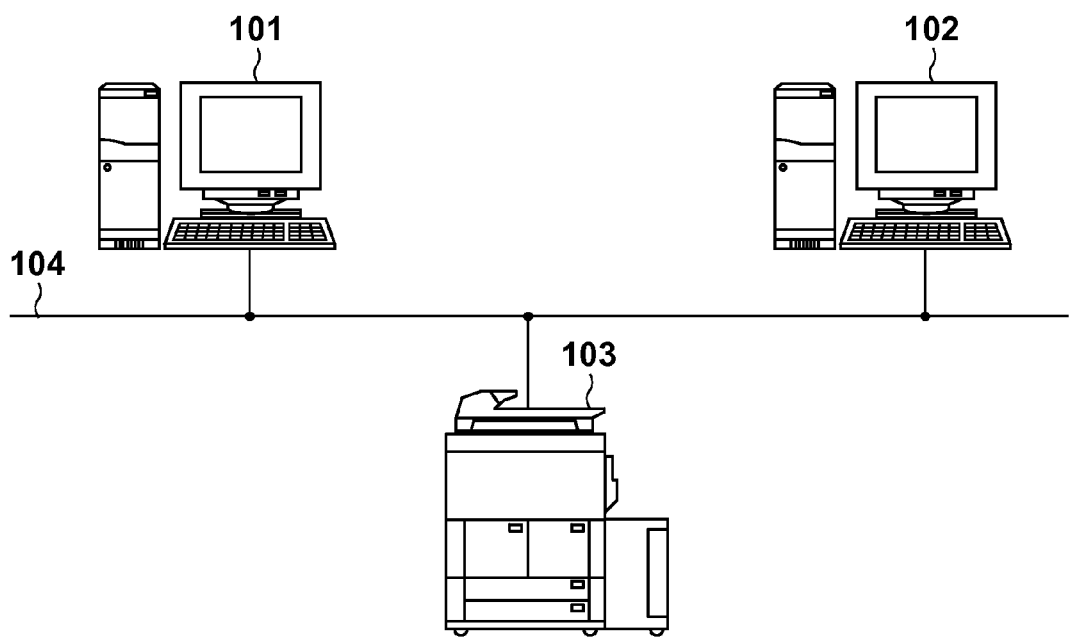
FIG. 1 is a view showing the configuration of a system including an information processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a repetitive description thereof will be omitted.

FIG. 1 is a view showing the configuration of a system including an information processing apparatus according to an embodiment of the present invention. As shown in FIG. 1, a file sharing server 101, an authentication server 102, and an information processing apparatus 103 are communicably interconnected via a network 104. The information processing apparatus 103 is, for example, an MFP (MultiFunctional Peripheral), which can optically read a paper document, convert it into electronic data, and transmit it to the file sharing server 101 via the network 104. This is called a transmission function. The information processing apparatus 103 has a user authentication function such as a login operation capable of acquiring user information, which enables a device administrator to set whether user authentication is necessary to operate the information processing apparatus 103. The information processing apparatus 103 manages the user name of each user, a password, a group to which the user belongs, and the like, which are necessary for user authentication. The authentication server 102, however, may manage the information. In this case, the information processing apparatus 103 acquires the information from the authentication server 102. Note that the group indicates a destination group obtained by grouping a plurality of users or destinations generally used for authentication or the like. An example of the group is "design section 11". Each user or destination can belong to one group or a plurality of groups.

Figure 2:
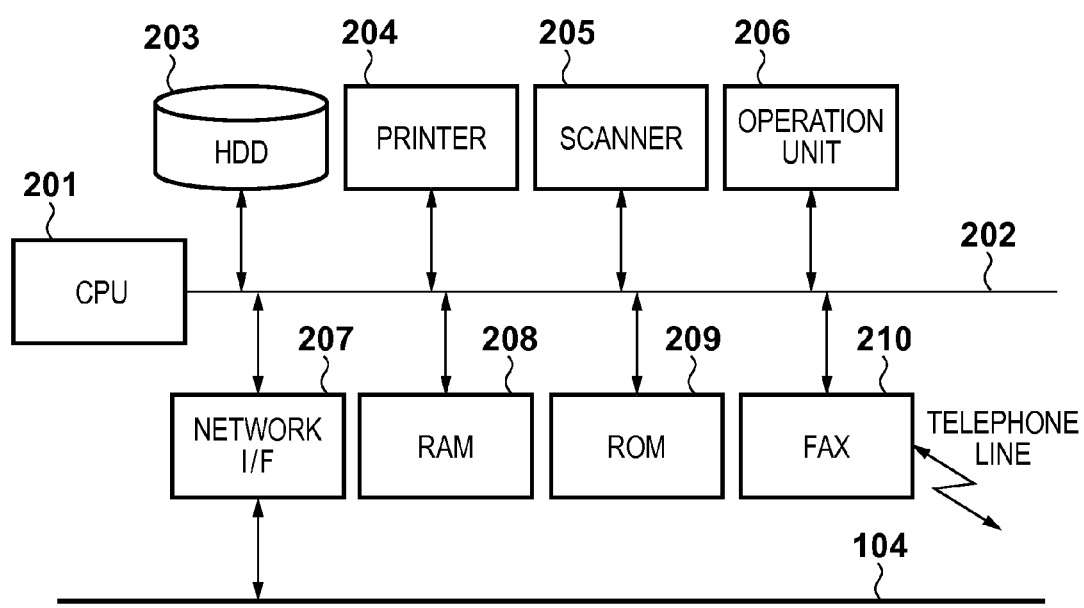
FIG. 2 is a block diagram showing the arrangement of the information processing apparatus.

FIG. 2 is a block diagram showing the arrangement of the information processing apparatus 103. A CPU 201 controls the information processing apparatus 103 as a whole by loading, to a RAM 208, a program stored in a ROM 209, and executing it. The CPU 201 also communicates with each unit of the information processing apparatus 103 via a bus 202. An operation unit 206 includes keys for accepting a user instruction, and a display unit for displaying various kinds of information of which the user should be notified. A scanner 205 optically reads, as a color image, an image on a document placed on a document table by the user, and stores thus generated image data in an HDD 203, the RAM 208, or the like. The HDD 203 is a hard disk drive, which stores image data generated when the scanner 205 reads a document, and various kinds of user data (address books, and a user name, a password, a group to which a user belongs, and the like which are necessary for user authentication). Note that the various kinds of user data may be acquired from the external authentication server 102, and then stored. The scanner 205 includes a document conveyance unit, which sequentially conveys a plurality of placed documents onto the document table.

A printer 204 prints an image based on input image data onto a printing medium such as a paper sheet. A network I/F 207 functions as an interface between the information processing apparatus 103 and the network 104 when transmitting, to the file sharing server 101 or authentication server 102, the image data read by the scanner 205. A FAX 210 transmits/receives image data via a telephone line.

In this embodiment, as shown in FIG. 2, one single CPU 201 executes the program to control the information processing apparatus 103 as a whole. The present invention is not limited to this. In FIG. 2, two or more CPUs may be included. In this case, the CPUs execute the program stored in the ROM 209 or HDD 203 to control the information processing apparatus 103 as a whole.

In this embodiment, an address book stored in the HDD 203 is used to set a destination in transmitting electronic data using the transmission function. It is possible to set, as an electronic data transmission destination, an e-mail address, the address of an FTP server, that of an SMB server, that of a Web DAV server, or a telephone number for FAX transmission in the address book.

The information processing apparatus 103 of this embodiment has a function of classifying a plurality of destinations registered in an address book into a plurality of groups, and managing them. These groups will be referred to as "destination tables" in this embodiment, and a function of classifying destinations using the destination tables will be referred to as a destination table function. Although eight destination tables 1 to 8 are held in this embodiment, the number of destination tables is not limited to eight. Since using the destination table function enables to classify a large amount of destinations registered in an address book into a plurality of destination tables, and manage them, the user can readily find a target destination in the address book. Note that in this embodiment, the user of the information processing apparatus 103 can refer to all the destination tables.

Furthermore, the information processing apparatus 103 of this embodiment has a function of managing groups of a plurality of destinations registered in the address book in association with groups managed by the authentication server 102 or the authentication function of the information processing apparatus 103. This function will be referred to as a group address book function. The information processing apparatus 103 manages a plurality of group address books corresponding to the plurality of groups managed by the authentication server or authentication function. The login user of the information processing apparatus 103 can refer to a group address book for which he/she has a browsing right.

Although the destination table function can be used even if the information processing apparatus 103 performs no user authentication, the group address book function is based on the premise that the information processing apparatus 103 performs user authentication.

Figure 3:
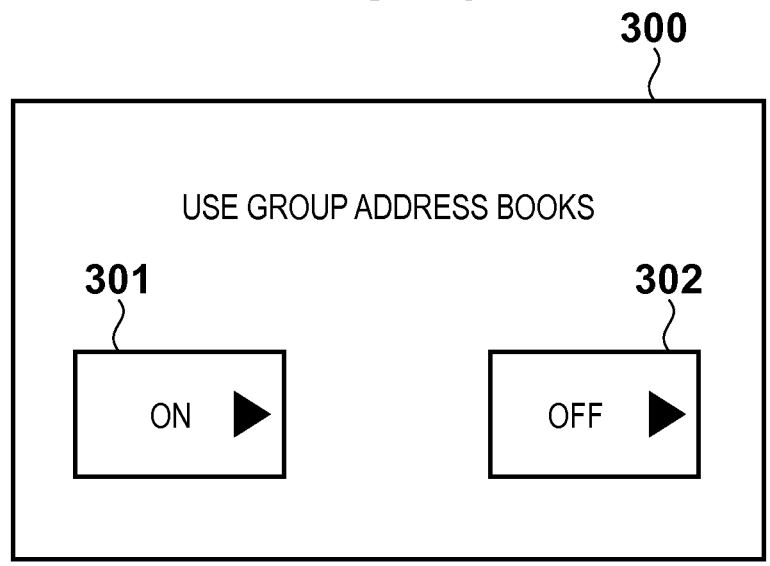
FIG. 3 is a view showing a screen for enabling to use a group address book function.

FIG. 3 is a view showing a screen 300 which is displayed on the operation unit 206 of the information processing apparatus 103, and allows the user to switch whether to use the group address book function.

The administrator of the information processing apparatus 103 can determine through the screen 300 whether to enable or disable the group address book function. If the user presses a button 301 on the screen 300, the group address book function is enabled (used). On the other hand, if the user presses a button 302, the group address book function is disabled (not used).

Figure 4:
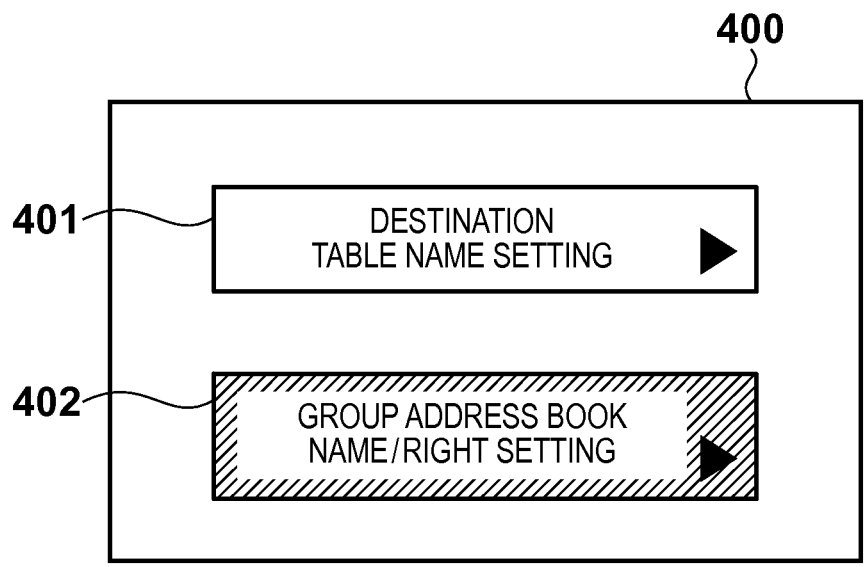
FIG. 4 is a view showing a screen for accepting a group address book name/right setting instruction.

FIG. 4 is a view showing a screen 400 for accepting a destination table name setting instruction and a group address book name/right setting instruction. In this embodiment, the administrator of the information processing apparatus 103 can set the names of a plurality of group address books, and users who are allowed to browse each group address book. In this embodiment, in addition to the browsing right, the administrator of the information processing apparatus 103 can set rights to register a new destination, edit an existing destination, and delete an existing destination. The browsing, registration, edit, and delete rights will be collectively referred to as access rights hereinafter. As shown in FIG. 4, a destination table name setting button 401 and a group address book name/right setting button 402 are displayed on the screen 400.

If the button 302 of the screen 300 has been selected, that is, the group address book function is not used, the group address book name/right setting button 402 is grayed out to be unselectable, as shown in FIG. 4. On the screen 400, instead of graying out the button to be unselectable, the button itself may not be displayed at all.

Figure 12:
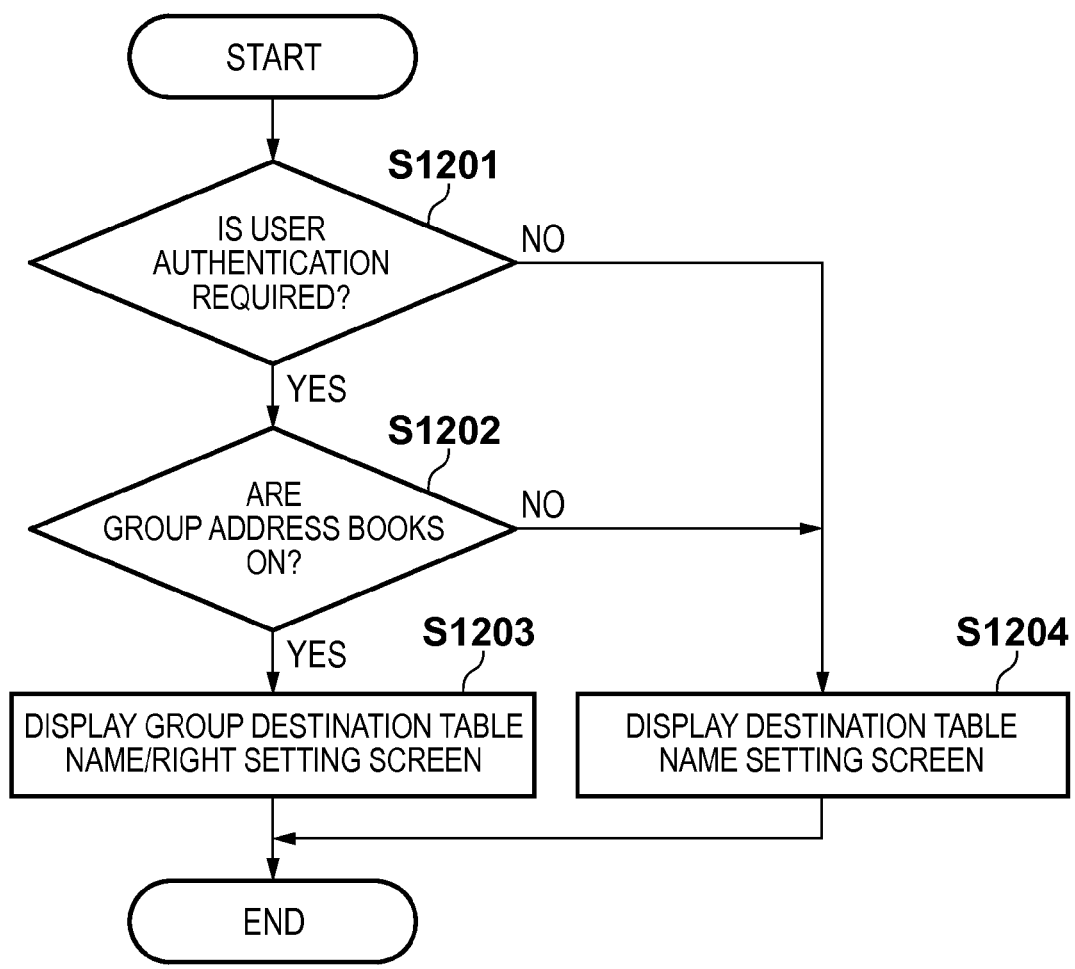
FIG. 12 is a flowchart illustrating a processing procedure of displaying the screen shown in FIG. 4.

FIG. 12 is a flowchart illustrating a display control processing procedure of displaying the screen 400 shown in FIG. 4. Each process shown in FIG. 12 is implemented when the CPU 201 loads, to the RAM 208, a program stored in the ROM 209, and executes it. Upon accepting a request to display the screen 400 shown in FIG. 4 through the operation unit 206, the CPU 201 determines whether user authentication is required to use the information processing apparatus 103 (step S1201). Note that accepting the display request indicates, for example, selecting a conventional menu for setting the name of a destination table list. In this case, for example, if the administrator has set to require an ID and password for the user to use the information processing apparatus 103, the CPU 201 determines that the information processing apparatus 103 requires user authentication.

If it is determined in step S1201 that user authentication is not required, the CPU 201 displays the destination table name setting button 401 of the screen 400 to be selectable, and displays the group address book name/right setting button 402 to be unselectable (step S1204). At this time, the CPU 201 may gray out the group address book name/right setting button 402 or may not display it at all. On the other hand, if it is determined in step S1201 that user authentication is required, the CPU 201 determines whether it has been set to use the group address books or not (step S1202). If the button 301 has been pressed on the screen 300 of FIG. 3, it is determined in step S1202 that it has been set to use the group address books. On the other hand, if the button 302 has been pressed, it is determined that it has been set not to use the group address books. If it is determined in step S1202 that it has been set not to use the group address books, the process advances to step S1204 to set the display state of the group address book name/right setting button 402 to a gray-out state or non-display state. If it is determined in step S1202 that it has been set to use the group address books, the display state of the group address book name/right setting button 402 is set to a selectable display state (step S1203). In step S1203, the button 401 may be set to a gray-out/non-display state, or may be displayed so that it can be pressed.

Figure 5A:
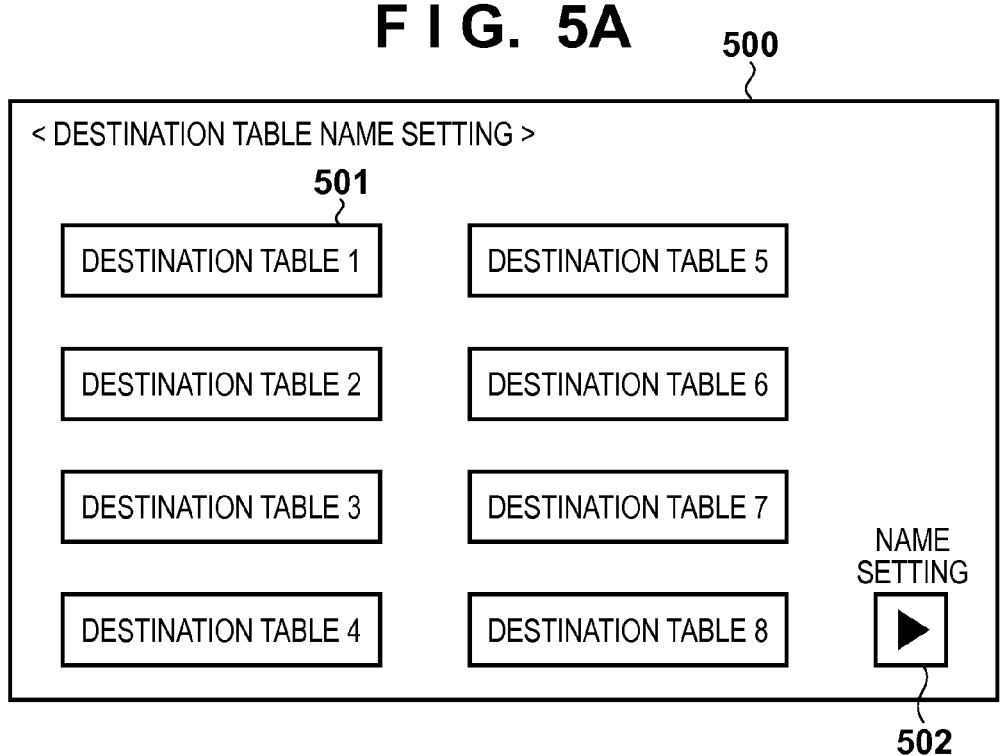
FIGS. 5A and 5B are views each showing a screen displaying a list for a group address book name/right setting operation.
Figure 5B:
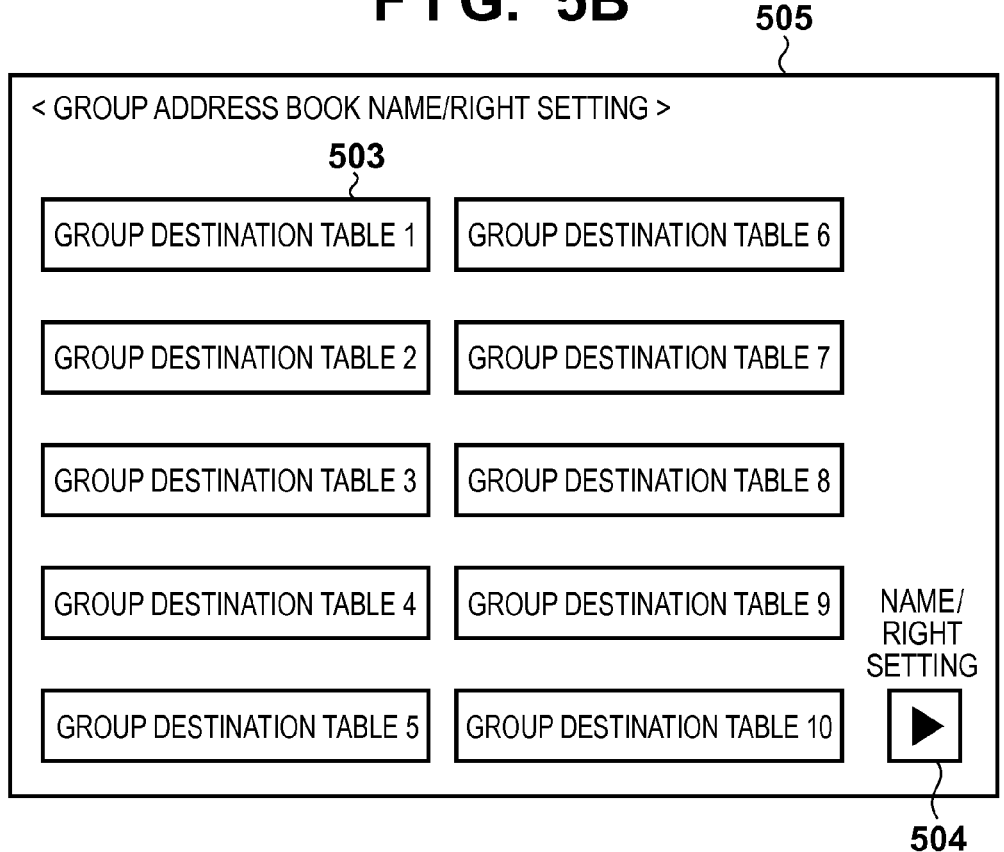

FIG. 5A shows a screen displayed upon press of the button 401 of FIG. 4. FIG. 5B shows a screen displayed upon press of the button 402. When the destination table name setting button 401 of FIG. 4 is pressed, the administrator can set the name of each destination table through a screen 500. FIG. 5A shows a screen for setting (changing) the name of a destination table. As shown in FIG. 5A, the default names of the respective destination tables are displayed as "destination table 1" to "destination table 8". If the administrator selects one of "destination table 1" to "destination table 8" of destination table buttons 501, and then presses a name setting button 502, he/she can arbitrarily change the name of the selected one of "destination table 1" to "destination table 8".

If the group address book name/right setting button 402 of FIG. 4 is pressed, the user can set the name of each group address book, and access rights on a screen 505. As shown in FIG. 5B, the default names of the respective group address books are displayed as "group destination table 1" to "group destination table 10". The button of each of "group destination table 1" to "group destination table 10" is linked with one group address book. If the administrator selects one of "group destination table 1" to "group destination table 10" of group destination table buttons 503, and then presses a name/right setting button 504, he/she can arbitrarily change the name of the selected one of "group destination table 1" to "group destination table 10". Furthermore, if the administrator selects a desired group address book, and then presses the name/right setting button 504, he/she can set users who can access the group address book, and access rights for each user.

Figure 6:
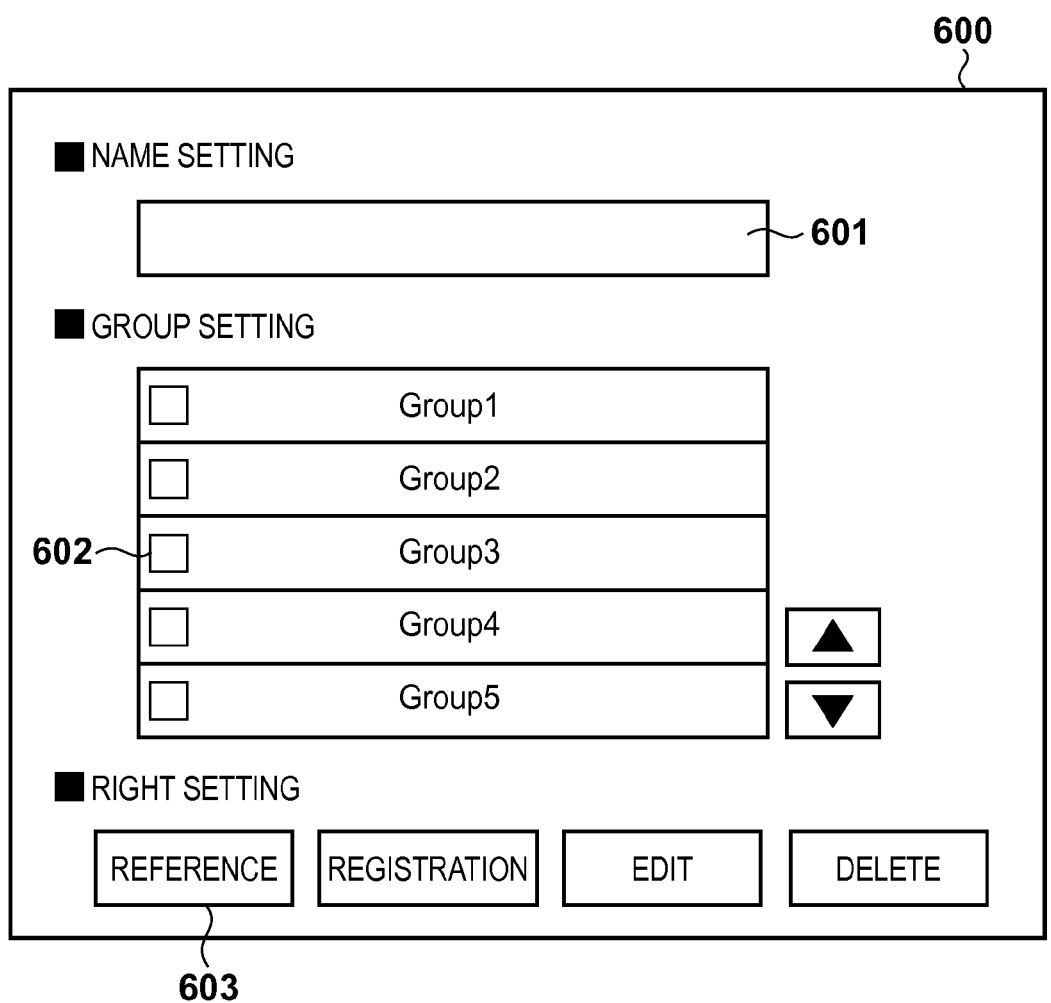
FIG. 6 is a view showing a screen for performing a name/right setting operation for each group address book.

FIG. 6 is a view showing a screen displayed upon press of the name/right setting button 504 shown in FIG. 5B. It is possible to set an arbitrary character string in a name setting field 601 on a screen 600, thereby enabling the user to change the name of each of "group destination table 1" to "group destination table 10". In a region on the right of buttons 602, all user names and groups stored in the HDD 203 or authentication server 102 are displayed. Only the groups may be displayed without displaying the user names.

The administrator can select a desired one of the displayed groups or users by pressing the corresponding button 602. In this embodiment, the selected group or user can access the group address book shown in FIG. 5B corresponding to the screen 600. When each group or user can access group address books, this means that a list of group address books is displayed in a list menu 801 shown in FIG. 8B, and the user can select one of them (to be described later).

As shown in FIG. 6, "reference", "registration", "edit", and "delete" right setting buttons 603 are arranged on the screen 600. By pressing the right setting buttons 603, the user can set various access rights for the group or user selected by the corresponding button 602. If, for example, the user presses "reference", the group or user selected by the corresponding button 602 is given a browsing right to browse the group address book corresponding to the screen 600. If the user presses "registration", the group or user selected by the corresponding button 602 is given a registration right to register a new destination in the group address book corresponding to the screen 600, in addition to the reference right. If the user presses "edit", the group or user selected by the corresponding button 602 is given an edit right to edit a destination already registered in the group address book corresponding to the screen 600, in addition to the reference and registration rights. Furthermore, if the user presses "delete", the group or user selected by the corresponding button 602 is given a delete right to delete a destination already registered in the group address book corresponding to the screen 600, in addition to the reference and registration rights.

Although the screen 600 shown in FIG. 6 is configured so that it is possible to set various access rights for all the plurality of groups or users selected by the corresponding buttons 602, it may be configured so that it is possible to set access rights for each group or user.

FIG. 7A is a table which is generated after making settings in FIGS. 5B and 6 and stored in the HDD 203. The table shown in FIG. 7A includes items 701 to 704. The item 701 corresponds to a name set in the name setting field 601. The item 702 indicates an identifier (ID) for identifying each listed group address in the corresponding item 701. The item 703 corresponds to a group or user selected by the corresponding button 602 of FIG. 6. The item 704 corresponds to an access right set by the corresponding right setting button 603.

FIG. 7B is a table which is stored in the HDD 203 after making settings in FIG. 5A. The table shown in FIG. 7B includes items 705 and 706. The item 705 corresponds to a name set by pressing the name setting button 502. The item 706 indicates an identifier for identifying each destination table in the corresponding item 705.

Figure 8A:
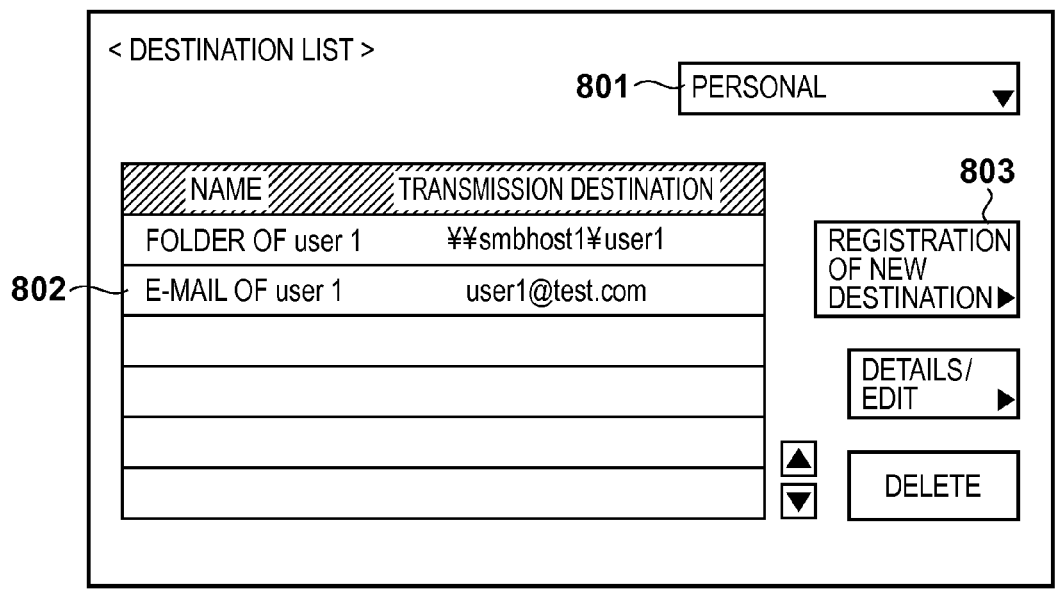
FIGS. 8A and 8B are views each showing a group address book screen displayed on an operation unit.
Figure 8B:
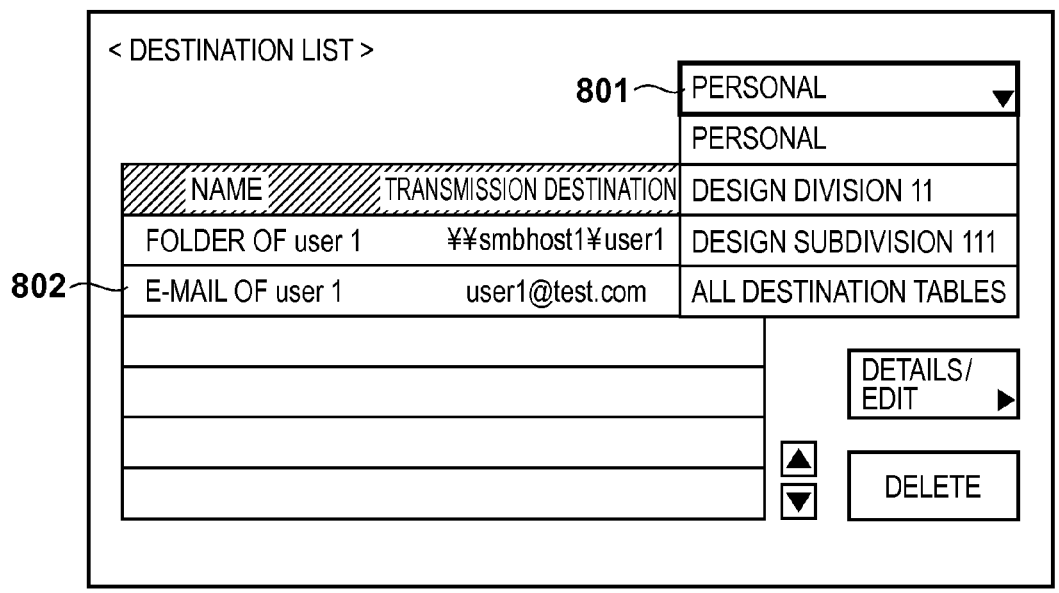

FIGS. 8A and 8B are views each showing an example of a screen displayed on the operation unit 206 after the user logs into the information processing apparatus 103. As shown in FIG. 8A, among the destinations in the table registered in the HDD 203, only the destinations of the login user of the information processing apparatus 103 are displayed in the list menu 801. The user can switch the destination display by operating the list menu 801. Destinations included in a destination group selected in the list menu 801 are displayed in a display region 802. Referring to FIG. 8A, when "user 1" logs into the apparatus, "personal" is displayed in the list menu 801, and the destinations ("¥¥smbhost1¥div" and "user1@test.com") of himself/herself are displayed in the display region 802. The folder name serves as a destination in SMB transmission (the file transmission function), and the e-mail address serves as a destination in an e-mail function.

As shown in FIG. 8B, if the user pulls down the list menu 801, the group address books (in this example, "design division 11" and "design subdivision 111") of groups for which the user has an access right, and "all destination tables" are displayed, in addition to "personal". As shown in FIG. 8B, in this embodiment, not all the group address books (group destination tables 1 to 10) registered in FIG. 5B are displayed in the list menu 801. That is, only the group address books of groups selected by the corresponding buttons 602 of FIG. 6, for which the user has the access right (at least the "reference" right has been set), are displayed, thereby improving the efficiency when the user browses to locate a desired destination. Assume, for example, that a group to which user 1 belongs is Group 1 in the table of FIG. 7A. In this case, when user 1 logs into the apparatus, only "group destination table 1", "group destination table 2", and "group destination table 9" that have been set to be accessible by Group 1 to which user 1 belongs are displayed in the list menu 801.

Figure 9A:
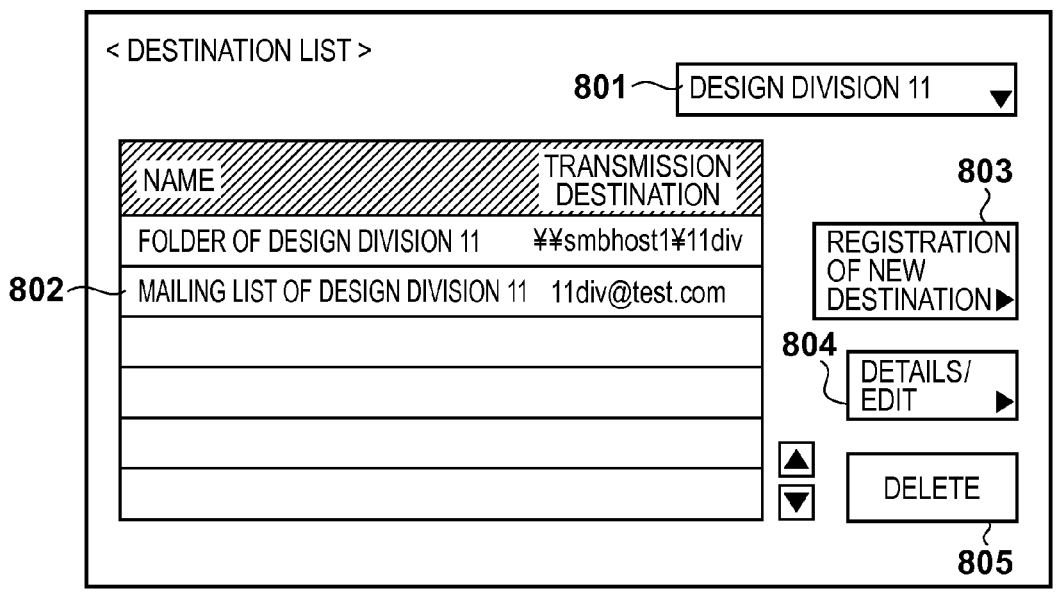
FIGS. 9A and 9B are views each showing another group address book screen displayed on the operation unit.
Figure 9B:
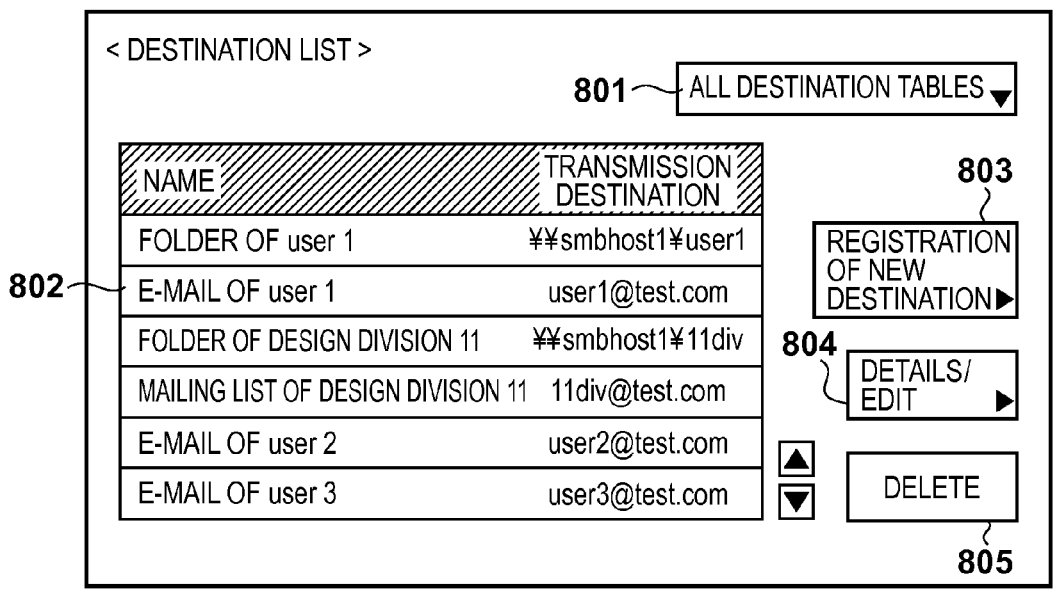

FIG. 9A shows a screen displayed when the user selects "design division 11" from the list menu 801. Only destinations associated with "design division 11" are displayed in the display region 802. If the administrator has set "design division 11" in the name setting field 601 of the screen 600, selected "Group 1" by pressing the corresponding button 602, and selected at least the right setting button "reference", the screen shown in FIG. 9A is displayed. FIG. 9B shows a screen displayed when the user selects "all destination tables" from the list menu 801. Destinations included in all the group address books accessible by the login user are displayed in the display region 802.

FIG. 10 is a view showing a screen for newly registering a destination, which is displayed when the user presses a registration button 803 shown in FIG. 9A. Note that the screen of FIG. 10 is displayed only when the "registration" or "edit" right has been set for the login user. Alternatively, the button 803 may be grayed out so that it cannot be pressed in FIG. 9A. The same contents as those displayed in the list menu 801, that is, the group address books accessible by the login user are displayed in a list menu 1001. The name of a destination to be newly registered is set in a destination name registration field 1002. A host name and the like for the destination to be newly registered are set in destination registration fields 1003. In this example, the user can set a host name, folder path, user name, and password. Through the screen shown in FIG. 10, the user can register a new destination in a group address book selected in the list menu 1001. If, for example, the user selects the group address book "design division 11" from the list menu 1001, and then presses an OK button, he/she can newly register a destination in "design division 11".

If the user presses a details/edit button 804 shown in FIG. 9A, an edit screen (not shown) for editing a destination is displayed. For example, a screen for enabling to edit the host name, folder path, user name, and password of an already registered destination is displayed. Such an edit screen is displayed only when the "edit" right has been set for the login user. Alternatively, in this case, the button 804 may be grayed out so that it cannot be pressed in FIG. 9A.

If the user presses a delete button 805 shown in FIG. 9A, a delete screen (not shown) for deleting a destination is displayed. For example, a list of already registered destinations is displayed, and the user can delete a desired destination. Such a delete screen is displayed only when the "delete" right has been set for the login user. Alternatively, the button 805 may be grayed out so that it cannot be pressed in FIG. 9A.

Figure 13:
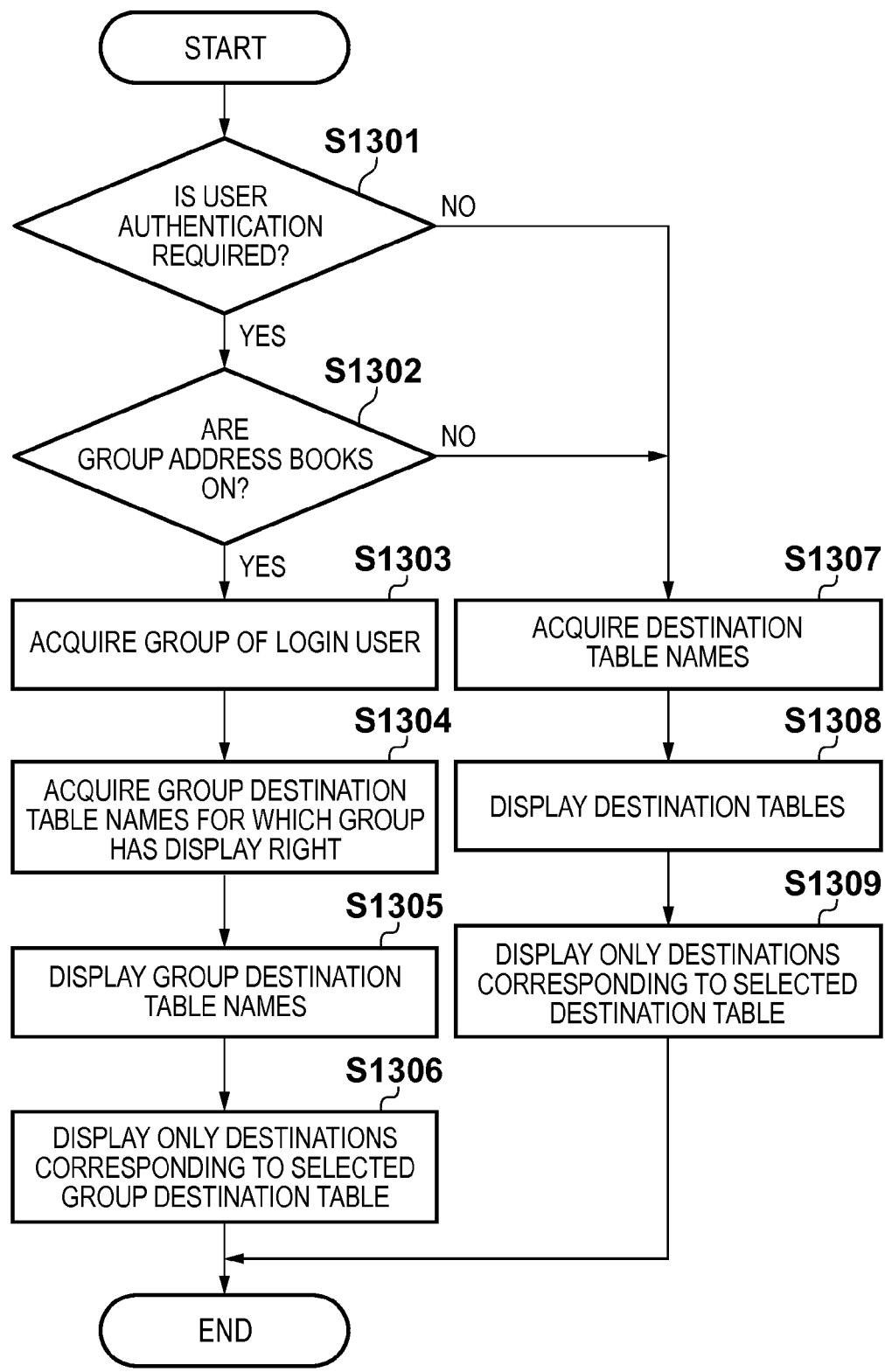
FIG. 13 is a flowchart illustrating a processing procedure of displaying the screen shown in FIG. 9A.

A display control processing procedure of displaying the screen shown FIG. 9A will be described below. FIG. 13 is a flowchart illustrating a processing procedure of displaying the screen shown in FIG. 9A. The processing shown in FIG. 13 is implemented when the CPU 201 loads, to the RAM 208, a program stored in the ROM 209, and executes it. Upon receiving a request to display the destination display screen shown in FIG. 9A through the operation unit 206, the CPU 201 determines whether the information processing apparatus 103 requires user authentication (step S1301). The processing in step S1301 is the same as that in step S1201 of FIG. 12. If it is determined in step S1301 that user authentication is not required, it is impossible to use the group address book function. In this case, therefore, the CPU 201 acquires the destination table names within the table shown in FIG. 7B, which is stored in the HDD 203 (step S1307). The CPU 201 displays the acquired destination table names in the list menu 801 (step S1308). When the user selects one destination table from the destination table list displayed in the list menu 801, the CPU 201 displays destinations included in the selected destination table (step S1309). This enables the destination table function.

If it is determined in step S1301 that user authentication is required, the CPU 201 determines whether it has been set to use the group address book function or not (step S1302). The processing in step S1302 is the same as that in step S1202 of FIG. 12. If it is determined in step S1302 that it has been set not to use the group address books, the above-described processing in steps S1307 to S1309 is executed. On the other hand, if it is determined in step S1302 that it has been set to use the group address books, the process advances to step S1303, in which the CPU 201 acquires the group information of the login user from the HDD 203 (step S1303). Note that the CPU 201 may acquire the group information from the external authentication server 102 instead of the HDD 203.

The CPU 201 compares the group information of the login user acquired in step S1303 with the access enable group of the item 703 shown in FIG. 7A. The CPU 201 then acquires the group address book ID of the item 702 and the group address book name of the item 701 which correspond to the item 703 including the group matching the group information (step S1304). The CPU 201 displays the acquired group address book names in the list menu 801 (step S1305).

When the user selects one of the group address books displayed in the list menu 801, the CPU 201 displays only destinations associated with the selected group address book (step S1306).

As described above, according to this embodiment, since a list of only group address books accessible by the login user is displayed, the user operability of a browsing operation can be improved. Furthermore, since it is possible to set various access rights for each group address book, it is possible to impose a limitation so that only a specific user can edit/delete a destination, thereby improving security.

FIG. 11A is a view schematically showing the data structure of each destination used in the group address book function according to this embodiment. FIG. 11B is a view schematically showing the conventional data structure of each destination. As shown in FIGS. 11A and 11B, each of the data structures includes a destination table ID 1101. The data structure shown in FIG. 11A, however, is different from that shown in FIG. 11B in that data of a group address book ID 1102 is held.

The destination table ID 1101 enables to uniquely specify a group address book to which the destination "user1@test.com" belongs. In this embodiment, the group address book ID 1102 allows to uniquely specify one of group address books 1 to 10 to which the destination "user1@test.com" belongs.

Figure 14:
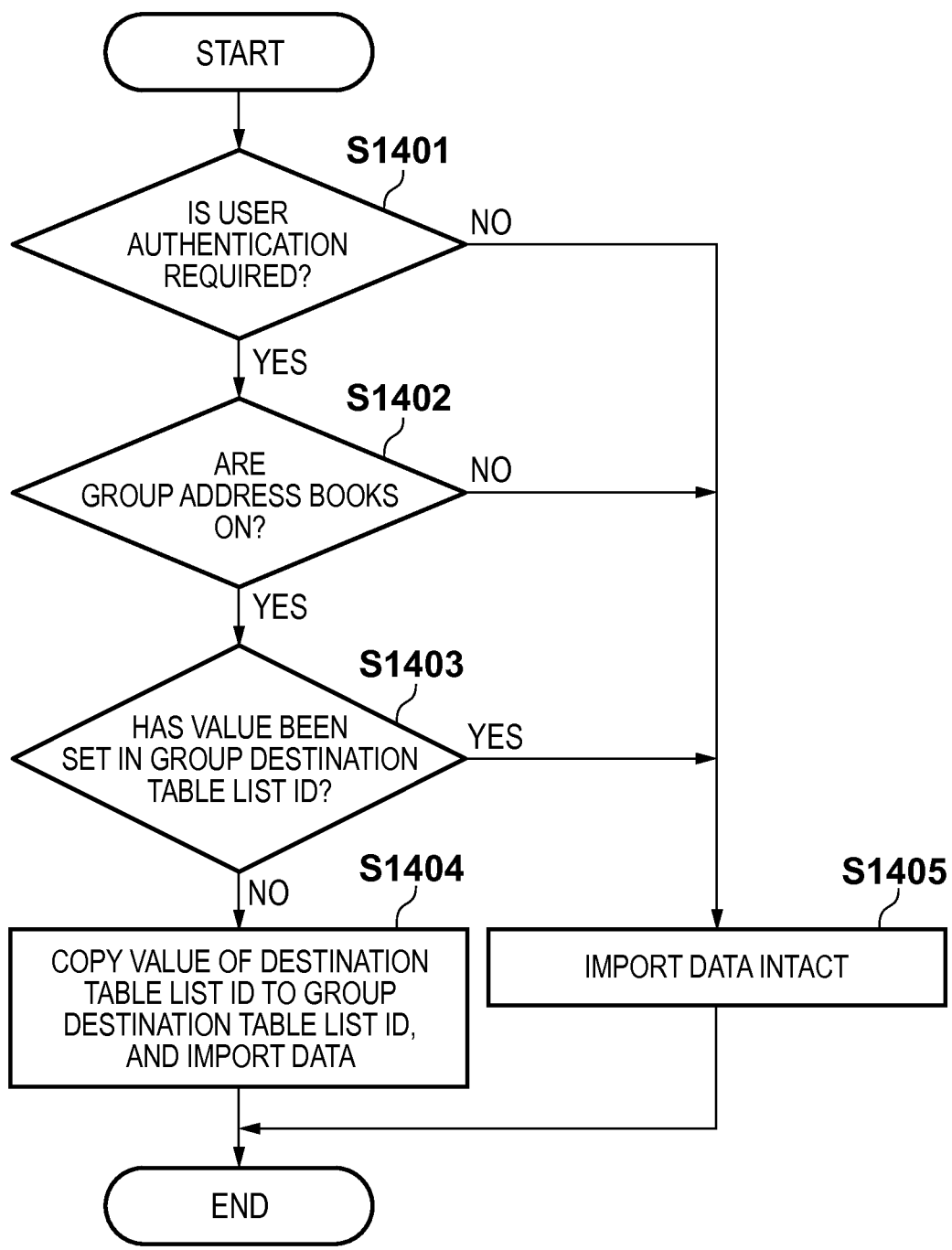
FIG. 14 is a flowchart illustrating a processing procedure of importing destination data.

FIG. 14 is a flowchart illustrating a processing procedure when the destination data which is shown in FIG. 11B and is not used by another information processing apparatus without the group address book function is imported (acquired) into the information processing apparatus 103 having the group address book function. The processing shown in FIG. 14 is implemented when the CPU 201 loads, to the RAM 208, a program stored in the ROM 209, and executes it.

Upon receiving an import request to externally import destination data via the network 104 or the like, the CPU 201 determines whether the information processing apparatus 103 requires user authentication (step S1401). The processing in step S1401 is the same as that in step S1201 of FIG. 12. If it is determined in step S1401 that user authentication is not required, it is impossible to use the group address book function. The destination data, therefore, is imported intact as shown in FIG. 11B without converting the format (step S1405).

On the other hand, if it is determined in step S1401 that user authentication is required, the CPU 201 determines whether it has been set to use the group address book function or not (step S1402). The processing in step S1402 is the same as that in step S1202 of FIG. 12. If it is determined in step S1402 that it has been set not to use the group address book function, processing in step S1405 is executed. On the other hand, if it is determined in step S1402 that it has been set to use the group address book function, the process advances to step S1403. In step S1403, the CPU 201 determines whether the group address book ID 1102 has been set in the destination data (step S1403). If it is determined that the group address book ID 1102 has been set, the destination data is usable in the group address book function, and is therefore imported intact without converting its format (step S1405).

On the other hand, if it is determined in step S1403 that the group address book ID 1102 has not been set, the destination data is not usable in the group address book function, as shown in FIG. 11B. That is, if the destination data is imported intact, it cannot be used in the group address book function. In this embodiment, therefore, the group address book ID 1102 having the value of the destination table ID 1101 is added to the destination data in import processing (step S1404).

As described above, destination data which is not usable in the group address book function is nonetheless imported, and a table as shown in FIG. 7A can be generated based on the imported data. In this case, the group address book list function of this embodiment inherits classification of destinations in old destination tables.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-025532, filed Feb. 8, 2012, which is hereby incorporated by reference herein in its entirety.

What is claimed is:

1. An information processing apparatus for displaying a list of destination groups obtained by grouping destinations, the apparatus comprising:
    a memory configured to store a table in which a destination group and a user having a browsing right to browse the destination group are associated with each other; and
    a CPU coupled to the memory,
    wherein the CPU is programmed to provide:
        an authentication unit configured to authenticate a user of the information processing apparatus;
        a list display unit configured to refer to the table, to determine, based on user information, at least one destination group for which the user, who has been authenticated by the authentication unit and to whom the user information corresponds, has the browsing right, and to display the determined at least one destination group;
        an acceptance unit configured to accept, from the user, a selection of a destination group from the determined at least one destination group displayed by the list display unit; and
        a destination display unit configured to display at least one destination included in the destination group selected by the user.

2. The apparatus according to claim 1, wherein the CPU is further programmed to provide:
    a determination unit configured to determine whether the user has an edit right to edit the destination displayed by the destination display unit; and
    an edit display unit configured to display, in a case where the determination unit determines that the user has the edit right, an edit screen for editing the destination displayed by the destination display unit.

3. The apparatus according to claim 1, wherein the CPU is further programmed to provide:
    a setting unit configured to set a user to have the browsing right to browse the destination group; and
    a first table generation unit configured to generate the table based on the user set by the setting unit.

4. The apparatus according to claim 1, wherein the CPU is further programmed to provide:
    a data acquisition unit configured to acquire data indicating the destination; and
    a second table generation unit configured to generate the table based on the data acquired by the data acquisition unit.

5. A display control method for an information processing apparatus, which displays a list of destination group obtained by grouping destinations, the method comprising steps of:

storing a table in which a destination groups and a user having a browsing right to browse the destination group are associated with each other;

authenticating a user of the information processing apparatus;

determining, based on user information and with reference to the stored table, at least one destination group for which the user, who has been authenticated in the authenticating step and to whom the user information corresponds, has the browsing right;

listing the at least one destination group determined in the determining step;

accepting, from the user, a selection of a destination group from the at least one destination group listed in the listing step; and displaying at least one destination included in the destination group selected by the user.

6. A non-transitory computer-readable storage medium storing a program that when executed causes a computer CPU to perform a display control method of an information processing apparatus, the method comprising steps of:

accessing a stored table in which a destination group and a user having a browsing right to browse the destination group are associated with each other;

authenticating a user of the information processing apparatus;

determining, based on user information and with reference to the stored table, at least one destination group for which the user, who has been authenticated in the authenticating step and to whom the user information corresponds, has the browsing right;

listing the at least one destination group determined in the determining step;

accepting, from the user, a selection of a destination group from the at least one destination group listed in the listing step; and displaying at least one destination included in the destination group selected by the user.

\* \* \* \* \*